(No Model.)
C. GEARING.
APPARATUS FOR THE MANUFACTURE OF GAS.
No. 414,038. Patented Oct. 29, 1889.
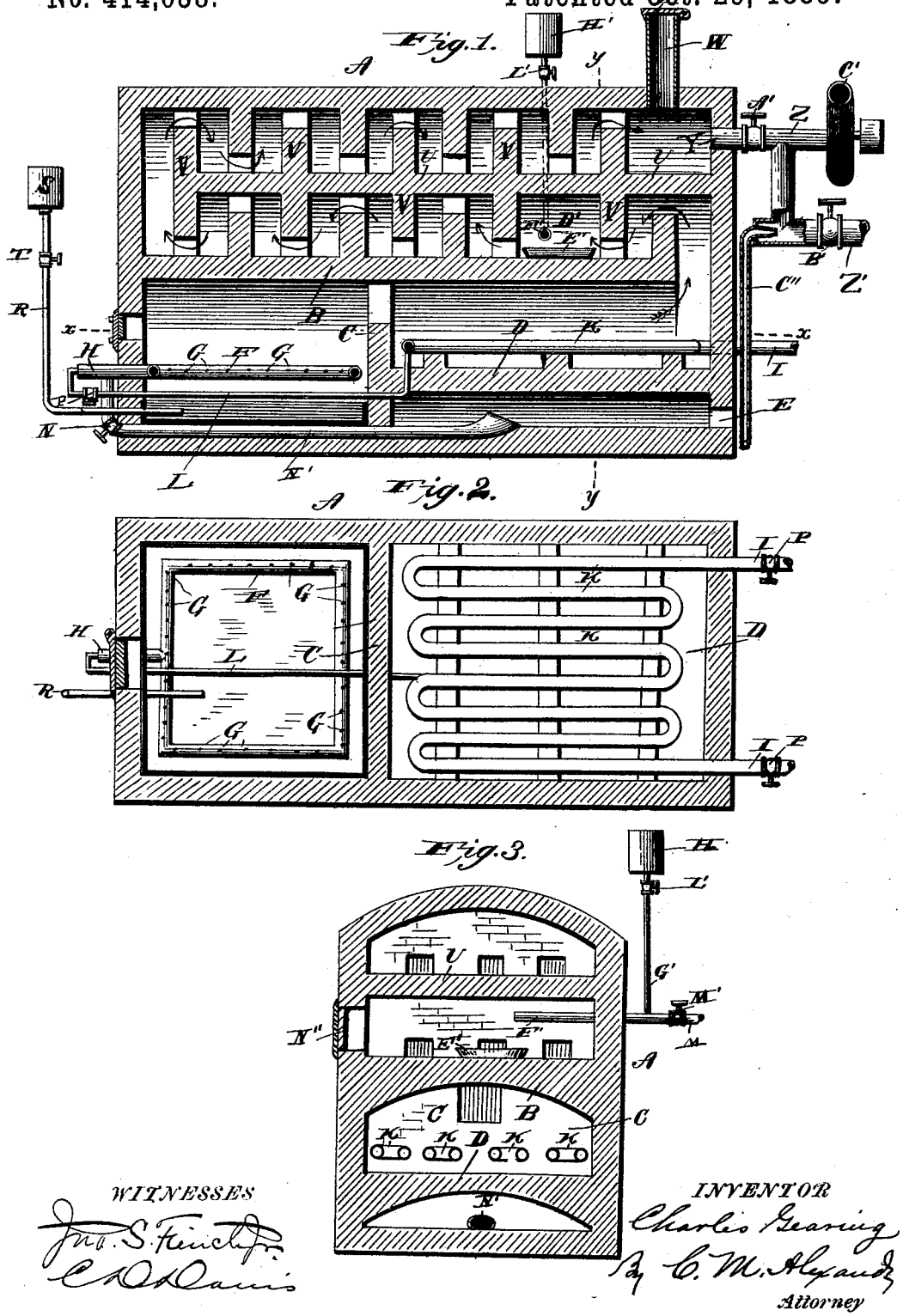

UNITED STATES PATENT OFFICE.

CHARLES GEARING, OF PITTSBURG, PENNSYLVANIA, ASSIGNOR TO CHARLES M. GEARING, OF SAME PLACE.

APPARATUS FOR THE MANUFACTURE OF GAS.

SPECIFICATION forming part of Letters Patent No. 414,038, dated October 29, 1889.

Application filed December 20, 1888. Serial No. 294,212. (No model.)

*To all whom it may concern:*

Be it known that I, CHARLES GEARING, a citizen of the United States, residing at Pittsburg, in the county of Allegheny and State of Pennsylvania, have invented certain new and useful Improvements in Apparatus for the Manufacture of Gas, of which the following is a specification, reference being had therein to the accompanying drawings.

This invention relates to certain improvements in the manufacture of gas for heating and illuminating purposes by the mutual decomposition of a fluid hydrocarbon in conjunction with air and steam; and it has for its objects to provide an apparatus consisting, essentially, of a furnace and a generator of peculiar construction, the two being so arranged and connected that the hydrocarbon may be burned in conjunction with air and superheated steam, so as to generate the necessary heat to bring about the decomposition of the gases in the generator and to generate initially a volume of mixed gases to be subsequently decomposed in conjunction with a suitable fluid hydrocarbon to produce the ultimate heating or illuminating gases, as more fully hereinafter explained.

The above-mentioned objects I attain by the means illustrated in the accompanying drawings, in which—

Figure 1 represents a longitudinal vertical section of an apparatus embodying my invention. Fig. 2 represents a transverse horizontal sectional view taken on the line *x x* of Fig. 1, and Fig. 3 represents a transverse vertical sectional view taken on the line *y y* of Fig. 1.

Referring to the drawings, the letter A indicates a structure of substantially rectangular shape, which is constructed of brick-work or other suitable material. The said structure is provided with a horizontal partition B, which extends from its forward end nearly to its rear, as shown in Fig. 1, and which divides the interior of the structure into two chambers. In the lower chamber is located a transverse bridge-wall or partition C, provided with a passage or a series of passages near the top, the said bridge-wall or partition dividing the said lower chamber into two smaller chambers, the forward one of which constitutes the combustion-chamber or fire-box of the apparatus and the rear chamber a superheater, for the purpose hereinafter described. The latter chamber is subdivided by a horizontal partition D, the lower chamber thus formed communicating with the atmosphere by a suitable passage E at the rear.

In the combustion-chamber at a suitable distance above the bottom is located a pipe F, which extends around the walls thereof, and is provided with a series of apertures G for the ejection of a mixture of steam and air which is injected into said combustion-chamber when the apparatus is in operation, as more fully hereinafter explained. Connected with the said pipe is a branch pipe H, extending through the forward wall of the fire-box or combustion-chamber, and with this latter pipe connects an air-pipe N', leading from the chamber below the partition D, through which a supply of air may be drawn and forced into the pipe F, before mentioned.

The letter I indicates a steam-pipe leading from a suitable generator through the rear wall of the structure into the chamber above the partition D and continued in said chamber in the form of a superheating-coil K. From the said superheating-coil extends a pipe L to the forward part of the structure, where it is bent upward and enters the forward end of the branch pipe H, terminating therein in a suitable nozzle, forming an injector, by means of which a current of steam is injected into the said pipe H and the pipe F connected therewith, so as to induce a current of air in conjunction with the steam through said pipes and inject the mixture into the fire-box or combustion-chamber in proper proportions. The said air and steam pipes are provided with proper valves N P, by means of which the quantity of air or steam admitted is regulated.

In the lower part of the fire-box or combustion-chamber is located an oil pan or receptacle for the fluid hydrocarbon, and through the forward wall of the said combustion-chamber or furnace extends a pipe R, leading from a hydrocarbon-reservoir S, through which the hydrocarbon may be supplied to the pan, the flow being regulated by means of a suitable cock or valve T.

The upper chamber of the structure A is divided by means of a horizontal partition U into two chambers, one above the other. The said partition extends from the rear of the structure to near the forward end thereof, as shown in Fig. 1 of the drawings. The said upper and lower chambers are divided into smaller chambers by means of a series of vertical partitions V, having passages alternately at the top and bottom, as shown, through which the gases from the superheating-chamber pass in the direction of the arrows, as shown in Fig. 1 of the drawings.

W indicates an eduction-flue leading from the rear of the upper chamber of the furnace, which is provided with a damper or valve X, by means of which said flue may be opened or closed at will. From the rear of said upper chamber also extends a pipe Y, provided with branches Z Z', leading, respectively, to a service pipe or holder and provided with suitable valves A' B', by means of which the flow of the escaping gas can be regulated. Either or both of these pipes may be provided with an exhaust device C' C", which may consist of an exhaust-fan or steam-injector, as shown in the drawings.

The chamber D' in the lower generating-chamber is provided with a pan E' or has its bottom and walls suitably lined, so as to form a hydrocarbon-receptacle, and into said chamber, which is made larger than the other, extends the end of an injector-pipe F', connected by a pipe G' with a suitable oil-reservoir H' and by means of a suitable pipe M with a steam-generator, by means of which a supply of hydrocarbon may be injected into said chamber. The said pipes are provided with suitable valves L' M', by means of which the flow of oil and steam may be regulated.

The letter N" indicates a suitable passage leading into the chamber D' at one side and provided with a suitable door, whereby access may be had to the chamber when desired for cleaning or other purposes. The forward wall of the combustion-chamber is also provided with a similar passage and door for a like purpose.

The operation of my improved apparatus is as follows: Oil or fluid hydrocarbon, being supplied to the pan in the lower part of the combustion-chamber through the supply-pipe, is ignited. A supply of steam and air is then injected into said chamber through the steam and air pipes, causing rapid combustion and generating a volume of mixed gases, which passes into the superheating-chamber at the rear. From this chamber they pass into the lower generating-chamber, entering first the chamber D', where they meet with a jet of oil and steam injected through the pipe F'. By this means a mutual decomposition of the gases, steam, and fluid hydrocarbon is effected, the resultant gases and vapors passing to the front in the direction of the arrows and then to the rear through the upper chamber in the direction of the arrows shown therein. From the upper chamber the gases are finally passed to the holder or through a suitable main to the point of consumption by means of the branching eduction-pipe.

Having thus fully described my invention, what I claim, and desire to secure by Letters Patent, is—

1. The combination, in a gas apparatus, of a structure A, provided with a horizontal partition B, a combustion-chamber located below this partition, valved pipes and an injector for supplying this combustion-chamber with gas-producing materials, a superheating-chamber separated from the said combustion-chamber by a perforated wall C, a superheating-coil in this superheating-chamber and connected to the injector of the said combustion-chamber, tortuous generating-chambers located above and communicating with the said superheating-chamber, a pipe F', for supplying hydrocarbon to one of the said generating-chambers, an oil-supply tank connected to this pipe, an injector also connected to this pipe, and an exhaust apparatus connected to one of the generating-chambers for withdrawing the resultant gases, substantially as and for the purpose herein set forth.

2. In a gas apparatus, the combination of a combustion-chamber, valved pipes and an injector for supplying gas-producing materials to the said combustion-chamber, tortuous gas-generating chambers located above and communicating with each other and the combustion-chamber below, means for exhausting the gases from the upper one of these chambers, a hydrocarbon-supply pipe leading into the lower gas-generating chamber, and an injector for forcing the hydrocarbon into the said chamber, as and for the purposes herein set forth.

In testimony whereof I affix my signature in presence of two witnesses.

CHARLES GEARING.

Witnesses:
J. CHAS. DICKEN,
W. C. DICKEN.